Patented Jan. 5, 1954

2,665,215

UNITED STATES PATENT OFFICE 2,665,215

METHOD OF MAKING BAKERY PRODUCTS AND COMPOSITION THEREFOR

Philip P. Gray, Forest Hills, N. Y., assignor to Wallerstein Company, Inc., New York, N. Y., a corporation of New York No Drawing. Application September 30, 1949, Serial No. 118,999

7 Claims. (Cl. 99—91)

1

This invention relates to a method of making bakery products and enzymatic compositions utilized in carrying out the method.

Flours obtained from cereal grains normally contain natural enzymes. Their presence and amount of activity varies considerably with the types of grains, areas, seasons and climates in which the grain is grown.

In general the natural enzymes do not attain the practical concentrations required for the preparation of doughs and the baking thereof into bread, rolls, buns and other bakery products. For this reason enzymes are added by the miller to diastate the deficient flours and by the baker to enhance the characteristics of the doughs and the baked products. To accomplish this the miller may add enzymes in the form of malted cereals or flours and the baker may add additional enzymes in the form of malt extract or malt syrup.

The use of diastatic malt syrup by the baker for such purposes has long been standard practice. To a large extent, this use has been superseded or supplemented in recent years by the practice, now widespread, whereby supplementation of the flour for use in baking is carried out by the miller. Thus, under the Food, Drug and Cosmetic Act, definitions and standards of identity for flour are presently in force which state that "to compensate for any natural deficiency of enzymes, malted wheat, malted wheat flour, malted barley flour, or any combination of two or more of these, may be used; but the quantity of malted barley flour so used is not more than 0.25 percent."

The quality of flour with respect to baking varies widely with differences due to varities, soil, climate, etc. and it is common practice, before final evaluation can be made, to require baking tests even for a particular variety from the same locality with each new crop of grain. The use of enzymes to supplement any natural deficiency of the flour in this respect is only one aspect of many possible sources for such variation, (for example, susceptibility of the starch in a given flour to enzymes is another) and considerable complexity therefore exists. This can be seen from the various criteria employed in standardizing flours as to their need for and sufficiency of "alpha-amylase" supplementation. Originally, it was assumed that the addition of such amylolytic enzymes was needed primarily to supply necessary amounts of fermentable sugar obtained from the starch on hydrolysis for fermentation by the yeast so as to provide the quantity of

2 carbon dioxide gas necessary for proper leavening. As a result, tests such as maltose values or pressure-meter readings (gassing power) were and still are frequently used as guides. With the development of knowledge that supplementation concerned largely "alpha-amylase" activity, which may be characterized by dextrinization action, a simple dextrinization procedure was commonly used for controlling such supplementation. However, tests supposedly more closely related to practical effect on the physical characteristics of the dough are also given considerable weight, for example, the use of the amylograph.

Finally, it must be recognized that the effects desired in regard to quality, loaf volume, crumb texture, controllability, etc., cannot be reflected in such simple tests and baking trials must be resorted to with observation of these qualities in the finished loaf.

Malt enzymes now used for supplementation act by modifying the characteristics but introduce problems of control because of unstandardized activities due to the presence of varying amounts of other enzymes, frequently undesirable. By the same token, these malt type conditioners may be deficient in the particular type of enzyme most desired. By way of explanation, it must be realized that all enzymes with alpha-amylase activity are by no means equivalent or interchangeable as the differences in the source and nature within the class of amylases will produce marked differences in the final products. It must be remembered that while it has been convenient to use a determination of alpha-amylase activity by a given procedure, such as the SKB method described in "Cereal Chemistry," vol. 16, p. 712 (1939), this is a satisfactory control method for supplementation only so long as enzymes of one source, as from malted grains, are used.

A disadvantage to these malt supplements is that in order to obtain a specific desired result from the alpha-amylase content, too great or too little an effect will be derived from the associated enzymes present tending toward frustration of the desired effect.

Another disadvantage is that the enzymes may act prematurely or are inactivated at baking temperatures before they fulfill their function in economical proportions.

Still another disadvantage in the prior art is that the enzymes react within a narrow temperature range before inactivation and are only available for action upon the chemical and physical structures formed prior to the inactivation temperature.

It is recognized in the art of baking products from cereal flours, for example, baking bread, that the chemical content and physical structures are are not static ones but are dynamic, progressively changing with time, temperature, rate of heating, physical manipulation, etc.

The object desired is to modify the dough structure consisting of a fine dispersion of gas in a complex colloidal matrix of starch and gluten in such a way that the stability of this colloidal dispersion can be maintained through the floor and baking periods. This, together with the need for a regularly continuing supply of sugars at an optimum rate for gas production, requires a certain kind as well as degree of starch hydrolysis with a minimum of attack on the gluten (protein) component.

Any fortification that operates within a narrow range is perforce limited in the scope of variations it may effect. It is, therefore, desirable to slowly, continuously and automatically create or release the chemical influence concurrently with the progressive chemical and physical changes of the dough and bread during the dough and baking stages.

I have found that combinations of three specific types of enzymes in definite proportions will give a continuous enzymatic action not heretofore attained by any other method. Such combinations will prevent a concentrated evolution of gas or enzyme effect, especially at undesired phases or stage of bread baking. Instead, the combination of enzymes will level out the peak emissions of large bubbles of gas to an even and progressive generation of fine gas bubbles during the complete time cycle of baking. Concurrently, the effective enzymes will progressively, rather than spasmodically, alter the amylaceous and glutenous structures as they form and to the degree they need be modified.

The preferred enzymatic composition comprises enzymes derived from the following sources:

1. Fungal amylases produced by *Aspergillus oryzae* and related fungi such as *A. niger*. These enzymes have generally high alpha amylase activity and also contain enzymes of the so-called starch-glucogenase enzyme system, which break down the starch to glucose. Proteolytic enzymes may also be present but for optimal results low levels of this type of enzyme activity is preferred. These enzymes are prepared by the growth of the fungal organisms in suitable culture media and subsequent purification by precipitation either with salts or organic solvents such as alcohol.

2. Malt diastase as prepared by the precipitation and purification of the enzymes from extracts of malted barley or other malted cereals. Malt diastase contains mixtures of the so-called alpha and beta amylase of malt. The alpha enzyme is the dextrogenic type of enzyme while the beta is the saccharogenic or sugar forming enzyme which produces maltose as the end product of its reaction on starch. The malt diastase may be provided in the form of malted cereals or extracts and syrups derived therefrom. It is preferred that the proteolytic activity of the malt diastase preparation be held to low practical levels.

3. Bacterial enzyme, being a purified material derived from the growth of organisms from the group, *Bacillus mesentericus* or *Bacillus subtilis*. The enzyme is of the alpha amylase type and shows very high heat resistance.

Generally, the fungal amylases employed show an effective range of temperature up to about 65° C., in the case of malt diastase up to about 80° C., and in the case of bacterial amylase activity continues in the presence of the protective effect of starch quite close to 100° C. The lower temperature limits will naturally vary more widely but under conditions usually employed and in the relative proportions of the different enzymes indicated as satisfactory, the practical effective lower limits in temperature for these enzymes may be given at 30° C. for fungal amylase, 50° C. for malt diastase, and 75° C. for bacterial amylase. As a result, one may picture a steady progressive action in the course of the baking process beginning with the activity of the fungal and to a slight extent of the malt amylases in the sponge and fermentation stages. As the temperature increases in the oven the chief effect of the fungal enzymes occurs in the temperatures between 30° C. and 65° C., of the malt diastase between 50° C. and 80° C., and of the bacterial between 75° C. and 95° or more within the very last few minutes of baking.

I have found that the enzyme activities in the dough may range as follows: The cereal diastases may contribute from 5 to 30 SKB units per 100 g. of flour; the bacterial amylase may contribute from 0.05 to 2.5 SKB units per 100 g. of flour; and the fungal amylase may add from 20 to 80 units per 100 g. of flour.

The amount of fungal amylase may vary within fairly large limits even outside of those given above, depending on the degree of proteolytic activity. The lower the proteolytic activity, the greater can be the range of fungal enzyme employed.

The amount of bacterial enzyme employed should not be great enough to form a sticky or soggy crumb in the baked product.

In case the flour employed has a naturally high amylase content or has been supplemented with a malted cereal by the miller, then the malt diastase component of the combined enzyme preparation is decreased by a corresponding amount. If the enzyme content of the flour is such that it already contains the amount of cereal amylase that would normally be added in the combined enzyme preparation then a mixture of only the two components, the fungal and the bacterial, would be used in the stated proportions.

The continued, progressive, enzymatic effect is not only due to the different types of enzymes, but also to their relative amounts in the mixture. I have found that for the production of white bread the enzyme activities of the dough in the following relative proportion is about optimal: Seventy-five per cent of the total alpha amylase activity is due to the fungal enzyme. Twenty-four per cent of the total alpha amylase activity is due to the cereal diastases and one per cent of the total alpha amylase activity is due to the bacterial alpha amylase. While these amounts are considered optimal, there is, of course, a certain amount of leeway on either side of these proportions without departing from the possibility of obtaining the desired continued enzyme effect.

In commercial usage these enzymes are generally standardized at some convenient alpha amylase level for uniformity and convenience of use. If the combined enzyme preparation is standardized at 400 SKB alpha units per gram, the use of about 0.05 to 0.25 per cent of the enzyme mixture based on the amount of flour employed will produce the improved result. This will provide a flour having an added alpha amylase activity of from 20 SKB units to 100 SKB units per hundred grams of flour. For enzyme preparations standardized at other levels, proportional amounts are employed.

*Example 1.—White bread, sponge dough method*

Sponge:

Flour (10 SKB units per 100 g. due to cereal diastases), 60 pounds
    Water, 38 pounds
    Yeast, 2 pounds
    Yeast food, ¼ pound Mix ingredients, allow to ferment for about four and one-half hours, then place back in mixer and add the following:

Dough:

Flour (10 SKB units per 100 g. due to cereal diastases), 40 pounds
    Water, 25 pounds
    Milk solids, 4 pounds
    Sugar, 5 pounds
    Shortening, 4 pounds
    Salt, 2 pounds
    Combined enzyme preparation, 0.1 pound Mix and allow to floor for a short time. Divide, scale and round up. Proof for about ten minutes, mold and pan. Proof at about 95° F. for about one hour and bake at 450° F. for thirty minutes.

The combined enzyme preparation has an SKB alpha amylase activity of 300 alpha amylase units per gram and may be added either to the sponge or to the dough mixture as desired. This preparation is composed of purified fungal amylase derived from *Aspergillus oryzae* contributing 296 SKB units of activity per gram of the preparation and purified bacterial amylase derived from *Bacillus mesentericus* contributing 4 SKB units of activity per gram of the preparation, together with an inert diluent.

*Example 2.—White bread, straight dough method*

Hard wheat flour (5 SKB units per 100 g. due to cereal diastases), 100 pounds

Water, 61 pounds
Salt, 1¾ pounds
Sugar, 2 pounds
Yeast, 1¾ pounds
Shortening, 2 pounds
Dry milk, 5 pounds
Combined enzyme preparation, 0.1 pound Dissolve the yeast and the sugar in about three quarts of water. Put the balance of the water, salt, milk powder, shortening and enzyme in the mixer, add the yeast suspension in sugar solution and stir to dissolve the ingredients. Add the flour and begin mixing until the dough is smooth and elastic. Ferment for four hours, dividing the time as follows: first rising, 2¼ hours; second rising, 1 hour; third rising ½ hour. Allow the dough to rest 15 minutes and then divide and scale. Round the loaf and give additional proofing. Mold, pan, allow to proof in the pan, and then bake at 425° F. for one-half hour.

The combined enzyme preparation used in the above formula has a total alpha amylase content of 400 SKB units per gram. This preparation is composed of purified fungal amylase derived from *Aspergillus oryzae* contributing 300 SKB units of activity per gram of the preparation; purified malt diastase contributing 96 SKB units per gram; and purified bacterial amylase derived from *Bacillus mesentericus* contributing 4 SKB units per gram; together with inert diluent.

*Example 3.—Italian bread*

Straight wheat flour (5 SKB units per 100 g. due to cereal diastases), 100 pounds Water, 57 pounds
Salt, 1½ pounds
Yeast, ¾ pound
Combined enzyme preparation, 0.15 pound.

Dissolve the yeast in two quarts of water. Put 36 pounds of water, 60 pounds of flour and the yeast suspension into the mixer and mix until smooth and elastic. Allow the sponge to ferment and after fermentation is complete, put the balance of the water and salt and enzyme preparation in the mixer and stir. Now add the sponge and break it up. After the sponge is broken up, add the balance of the flour and mix until the dough is smooth. Allow the dough to rise and then divide. Mold, pan, proof in pan and bake in the usual manner.

The combined enzyme preparation has a total alpha amylase activity of 400 SKB alpha amylase units per gram. This preparation is composed of purified fungal amylase derived from *Aspergillus oryzae* contributing 260 SKB units of activity per gram of the preparation; purified malt diastase contributing 138 SKB units per gram; and purified bacterial amylase derived from *Bacillus mesentericus* contributing 2 SKB units per gram; together with inert diluent.

Although the invention has been particularly described with reference to supplementation by incorporation of the enzymes in the dough by the baker, it will be evident that the invention may also be practiced with equally beneficial results by the miller who may add the enzymes to the flour.

I claim:

1. The method of making bakery products which comprises forming a dough including fungal amylase contributing from 20 to 80 SKB alpha amylase units per 100 g. of flour, cereal diastatic enzymes contributing from 5 to 30 SKB alpha amylase units per 100 g. of flour, bacterial amylase contributing from 0.05 to 2.5 SKB alpha amylase units per 100 g. of flour, and thereafter baking the dough.

2. The method of making bakery products which comprises forming a dough including fungal amylase, cereal diastatic enzymes, and bacterial amylase in which the fungal enzyme supplies about 75% of the total alpha amylase activity, the cereal diastatic enzymes supply about 24% of the total alpha amylase activity and the bacterial enzyme supplies about 1% of the total alpha amylase activity as standardized by the SKB test, and thereafter baking the dough.

3. The method of making bakery products which comprises forming a dough including a fungal amylase contributing from 20 to 80 SKB alpha amylase units per 100 g. of flour selected from the group consisting of *Aspergillus oryzae* amylase and *A. niger* amylase, cereal diastatic enzymes contributing from 5 to 30 SKB alpha amylase units per 100 g. of flour, and a bacterial amylase contributing from 0.05 to 2.5 SKB alpha amylase units per 100 g. of flour selected from the group consisting of *Bacillus mesentericus* amylase and *B. subtilis* amylase, and thereafter baking the dough.

4. A cereal flour for baking and the like comprising on the basis of 100 g. of flour fungal amylase contributing from 20 to 80 SKB alpha amylase units, cereal diastatic enzymes contributing from 5 to 30 SKB alpha amylase units, and bacterial amylase contributing from 0.05 to 2.5 SKB alpha amylase units.

5. A cereal flour for baking and the like as defined in claim 8 wherein the fungal enzyme supplies about 75% of the total alpha amylase activity, the cereal diastatic enzymes supply about 24% of the total alpha amylase activity and the bacterial amylase supplies about 1% of the total alpha amylase activity.

6. An enzymatic composition for supplementing flour, baker's dough and the like comprising a fungal amylase contributing from 20 to 80 SKB alpha amylase units per 100 g. of flour, cereal diastatic enzymes contributing from 5 to 30 SKB alpha amylase units per 100 g. of flour, and a bacterial amylase contributing from 0.05 to 2.5 SKB alpha amylase units per 100 g. of flour, the fungal amylase and the cereal diastatic enzymes having low levels of proteolytic enzyme activity.

7. An enzymatic composition for supplementing flour, baker's dough and the like as defined in claim 6 wherein the fungal amylase supplies about 75% of the total alpha amylase activity, the cereal diastatic enzymes supply about 24% of the total alpha amylase activity and the bacterial amylase supplies about 1% of the total alpha amylase activity.

PHILIP P. GRAY.

References Cited in the file of this patent

FOREIGN PATENTS

| Number | Country | Date |
|---|---|---|
| 340,072 | Great Britain | 1929 |
| 474,822 | Great Britain | 1936 |

OTHER REFERENCES

Redfern et al.: Cereal Chem. (1946), 23, #1, pages 1 to 15.

Anderson, Enzymes in Wheat Technology, 1946, Interscience Publishers, Inc., New York, pp. 113–115, pp. 120–121.